(12) United States Patent
Egi

(10) Patent No.: US 11,467,547 B2
(45) Date of Patent: Oct. 11, 2022

(54) CONTROL DEVICE

(71) Applicant: OMRON Corporation, Kyoto (JP)

(72) Inventor: Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/267,033

(22) PCT Filed: Sep. 27, 2019

(86) PCT No.: PCT/JP2019/038237
§ 371 (c)(1),
(2) Date: Feb. 9, 2021

(87) PCT Pub. No.: WO2020/067460
PCT Pub. Date: Apr. 2, 2020

(65) Prior Publication Data
US 2021/0302924 A1 Sep. 30, 2021

(30) Foreign Application Priority Data
Sep. 27, 2018 (JP) .............................. JP2018-182565

(51) Int. Cl.
*G05B 13/04* (2006.01)
*G05B 19/05* (2006.01)

(52) U.S. Cl.
CPC ............ *G05B 13/048* (2013.01); *G05B 19/05* (2013.01); *G05B 2219/13099* (2013.01); *G05B 2219/13186* (2013.01)

(58) Field of Classification Search
CPC .................................................. G05B 13/048
See application file for complete search history.

(56) References Cited

U.S. PATENT DOCUMENTS 8,260,593 B2 *  9/2012  Raschke ................. G06T 13/40
                                                           345/951
2004/0158355 A1 * 8/2004  Holmqvist ........... G05D 1/0236
                                                           701/23
(Continued)

FOREIGN PATENT DOCUMENTS

JP       2003241836       8/2003
JP       2011186878       9/2011
(Continued)

OTHER PUBLICATIONS

"International Search Report (Form PCT/ISA/210) of PCT/JP2019/038237," dated Dec. 24, 2019, with English translation thereof, pp. 1-4.
(Continued)

*Primary Examiner* — Ronald D Hartman, Jr.
(74) *Attorney, Agent, or Firm* — JCIPRNET

(57) ABSTRACT

Provided is a control device for performing model prediction control. A position of a virtual obstacle associated with a real obstacle is set based on a position of the real obstacle acquired by a first acquisition part so that the virtual obstacle is positioned substantially symmetrically to the real obstacle with reference to a following target trajectory of a control target. Stage costs calculated by a prescribed evaluation function include: a first stage cost associated with a first probability potential field representing a probability that the real obstacle is present based on the position of the real obstacle; and a second stage cost associated with a second probability potential field representing a probability that the virtual obstacle is present based on the position of the virtual obstacle and having a probability value equal to or greater than that of the first probability potential field.

15 Claims, 8 Drawing Sheets

(56) References Cited

U.S. PATENT DOCUMENTS

| | | | |
|---|---|---|---|
| 2009/0043440 A1 | 2/2009 | Matsukawa et al. | |
| 2011/0231016 A1* | 9/2011 | Goulding | G05D 1/0088 901/1 |
| 2012/0130595 A1* | 5/2012 | Hayakawa | B60W 30/12 701/42 |
| 2015/0120080 A1* | 4/2015 | Densham | G05D 1/0033 700/302 |
| 2015/0120138 A1* | 4/2015 | Zeng | G01S 13/931 701/41 |
| 2016/0016315 A1* | 1/2016 | Kuffner, Jr. | B25J 19/06 901/49 |
| 2019/0143968 A1* | 5/2019 | Song | B60R 11/04 701/301 |

FOREIGN PATENT DOCUMENTS

| | | |
|---|---|---|
| JP | 2017041223 | 2/2017 |
| JP | 2017102617 | 6/2017 |

OTHER PUBLICATIONS

"Written Opinion of the International Searching Authority (Form PCT/ISA/237) of PCT/JP2019/038237," dated Dec. 24, 2019, with English translation thereof, pp. 1-6.

Yuta Sakurai et al.,"Offset Compensation of Continuous Time Model Predictive Control by Disturbance Estimation", Thesis of Master Degree, vol. 25, No. 7,2012, pp. 172-180.

Jingfu Jin et al., "Decentralized cooperative mean approach to collision avoidance for nonholonomic mobile robots," IEEE International Conference on Robotics and Automation (ICRA), May 2015, pp. 35-41.

Toshiaki Ishikawa et al., "A Collision Avoidance Algorithm using Artificial Potential Method considering Relative Velocity," with English Abstract, The 22nd Annual Conference of the Japanese Society for Artificial Intelligence, Jan. 2008, pp. 1-4.

"Search Report of Europe Counterpart Application", dated May 16, 2022, p. 1-p. 9.

* cited by examiner

CONTROL DEVICE

CROSS-REFERENCE TO RELATED APPLICATION

This application is a 371 application of the International PCT application serial no. PCT/JP2019/038237, filed on Sep. 27, 2019, which claims the priority benefit of Japanese Patent Application No. 2018-182565, filed on Sep. 27, 2018. The entirety of each of the above-mentioned patent applications is hereby incorporated by reference herein and made a part of this specification.

BACKGROUND

Technical Field

The present invention relates to a control device which makes a control target follow a prescribed target command.

Related Art

Generally, feedback control is used to move a control target to follow a command trajectory. For example, in an articulated robot, servomotor control of each joint axis is performed by a control device of the robot in a manner that a position of a hand distal part of the robot is made to follow a command trajectory which is set previously (taught) by using the feedback control. However, in general feedback control, there is a problem that an actual track of the robot deviates from the command trajectory because a response delay inevitably occurs in each servomotor. In order to suppress this deviation with respect to the command trajectory, a technology related to model prediction control is used (for example, see Non-patent literature 1).

In addition, while a control target is made to follow the command trajectory, when a moving obstacle which may interfere with the control target is present, it is necessary to control the control target so as to avoid a collision with the obstacle. For example, in a technology shown in Patent literature 1, a probability potential field is formed based on a present probability of the obstacle which is present around the control target, and a route for the control target to advance is determined based on a gradient of the probability potential field. Similarly, in collision avoidance control of a vehicle shown in Patent literature 2, a probability potential field based on the present probability of the obstacle is also used.

LITERATURE OF RELATED ART

Patent Literature

Patent literature 1: Japanese Patent Application Laid-Open No. 2003-241836
Patent literature 2: Japanese Patent Application Laid-Open No. 2011-186878

Non-Patent Literature

Non-patent literature 1: Yuta Sakurai and Toshiyuki Ohtsuka: Offset Compensation of Continuous Time Model Prediction Control By Disturbance Estimation; Journal of System Control Information Society, Vol. 25, No. 7, pp. 10-18 (2012)

SUMMARY

Problems to be Solved

In order to make output of a control target suitably follow a target command by model prediction control and suitably avoid a collision with a moving obstacle present around the control target, it is preferable to use a probability potential field formed based on a present probability of the obstacle as shown in the conventional technology. However, when following a route generated for collision avoidance by the conventional technology, the control target tends to avoid the moving obstacle in front of the moving obstacle. In this case, because the control target eventually runs in parallel with the moving obstacle, a possibility of the collision with the obstacle continues for a long time, and a time required for the avoidance becomes long. In particular, in the case of a control target such as a robot or the like which has a limited movable range due to the finite length of components such as an arm and the like, if the possibility of the collision is prolonged, as a result, the collision with the obstacle may be inevitable.

The present invention is accomplished in view of the problems, and an objective is to provide a technology capable of suitably avoiding a collision with a moving obstacle when output of a control target is made to follow a target command by model prediction control.

Means to Solve Problems

In the present invention, in order to solve the problems described above, stage costs calculated by model prediction control for following control to a target command include a stage cost associated with a probability potential field of an actual obstacle (a real obstacle), and a stage cost associated with a probability potential field of a virtual obstacle corresponding to the real obstacle. Thereby, following to the target command and suitable obstacle avoidance are achieved.

The present invention viewed from a first aspect is a control device which includes a model prediction control part and makes output of a control target follow a prescribed target command, wherein the model prediction control part has a prediction model in which a correlation between a prescribed state variable related to a control target and control input to the control target is defined in a form of a prescribed state equation, performs model prediction control that is based on the prediction model on a prescribed target command to be followed by the output of the control target according to a prescribed evaluation function in a prediction interval of a prescribed time width, and outputs a value of the control input at least at an initial time of the prediction interval. Besides, the control device includes: a first acquisition part which acquires a position of a real obstacle that is an actual obstacle with respect to the control target, and a set part which sets a position of a virtual obstacle associated with the real obstacle based on the position of the real obstacle acquired by the first acquisition part in a manner that the virtual obstacle is positioned substantially symmetrically to the real obstacle with reference to a following target trajectory that is based on the prescribed target command and is to be followed by the control target. Stage costs calculated by the prescribed evaluation function include: a state quantity cost which is a stage cost related to the prescribed state variable, a control input cost which is a stage cost associated with the control input, a first stage cost which is associated with a first probability potential field representing a probability that the real obstacle may be present based on the position of the real obstacle, and a second stage cost which is associated with a second probability potential field representing a probability that the virtual obstacle may be present based on the position of the virtual obstacle and having a probability value equal to or greater than that of the first probability potential field.

The control device of the present invention makes the output of the control target follow the prescribed target command, and is configured to generate the control input to the control target by the model prediction control part. Besides, the prediction model included in the model prediction control part is formed based on the control target. Here, in the model prediction control, at each control time, the prediction interval of the prescribed time width is set, arithmetic processing according to the prescribed evaluation function is performed in the prediction interval, and the calculated control input value at least at the initial time in the prediction interval is generated and output in real time. In the model prediction control, the prediction interval moves with the passage of control time, and so-called Receding Horizon control is executed. Besides, the correlation between the prescribed state variable associated with the control target and the control input is reflected in the prediction model. By this configuration, the control input for following the prescribed target command can be generated in real time and output to the control target.

Here, while the control target is made to follow the target command, when an obstacle moving near the control target is present, it is necessary to suitably avoid a collision with the obstacle and realize the following to the target command. Therefore, the control device acquires the position of the real obstacle which is an actual obstacle by the first acquisition part and sets the position of the virtual obstacle corresponding to the real obstacle by the set part. The virtual obstacle is not an obstacle that actually exists, but an obstacle which is virtual and is set for the arithmetic of the model prediction control for following the target command corresponding to the real obstacle. The virtual obstacle is set at a position substantially symmetrical to that of the real obstacle with reference to the following target trajectory of the control target. This is because the probability potential field starting from the real obstacle and the probability potential field starting from the virtual obstacle can be arranged symmetrically with the following target trajectory sandwiched therebetween. Moreover, it does not mean that both the potential fields are formed exactly the same.

Besides, after the positions of the real obstacle and the virtual obstacle are grasped in this way, the stage costs calculated by the prescribed evaluation function for the model prediction control include the first stage cost corresponding to the real obstacle and the second stage cost corresponding to the virtual obstacle in addition to the state quantity cost and the control input cost. Therefore, in the model prediction control for following the target command, the first probability potential field in the correlation with the real obstacle and the second probability potential field in the correlation with the virtual obstacle can be made to act, wherein the second probability potential field is set substantially symmetrically to the first probability potential field with the following target trajectory sandwiched therebetween. As a result, in addition to a repulsive force (an action of moving the control target away) formed by the first potential field of the real obstacle, a repulsive force formed by the second potential field of the virtual obstacle acts on the control target, and thereby a following speed of the control target to the target command can be suitably reduced, and the real obstacle can be avoided in a manner that the control target is positioned behind the real obstacle (in a direction opposite to an proceed direction). This prevents the control target from advancing in parallel with the obstacle as in the conventional technology, so that the collision with the real obstacle can be suitably avoided.

In particular, in the control device described above, both the potential fields are set in a manner that the second potential field has a probability value equal to or greater than that of the first potential field. This means that the repulsive force formed by the second potential field of the virtual obstacle is equal to or greater than the repulsive force formed by the first potential field of the real obstacle. Therefore, by the model prediction control in which the stage costs are calculated as described above, the following speed of the control target to the target command is suitably reduced, and the avoidance of the real obstacle is suitably realized.

Here, grasping is made from a second aspect of the present invention which solves the above problems. The present invention viewed from the second aspect is a control device which includes a model prediction control part and makes output of a control target follow a prescribed target command, wherein the model prediction control part has a prediction model in which a correlation between a prescribed state variable related to a control target and control input to the control target is defined in a form of a prescribed state equation, performs model prediction control that is based on the prediction model on a prescribed target command to be followed by the output of the control target according to a prescribed evaluation function in a prediction interval of a prescribed time width, and outputs a value of the control input at least at an initial time of the prediction interval. Besides, the control device includes: a servo integrator to which a deviation between the prescribed target command and the output of the control target is input, a first acquisition part which acquires a position of a real obstacle that is an actual obstacle with respect to the control target, and a set part which sets a position of a virtual obstacle associated with the real obstacle based on the position of the real obstacle acquired by the first acquisition part in a manner that the virtual obstacle is positioned substantially symmetrically to the real obstacle with reference to a following target trajectory that is based on the prescribed target command and is to be followed by the control target. Stage costs calculated by the prescribed evaluation function include: a state quantity cost which is a stage cost related to the prescribed state variable, a control input cost which is a stage cost associated with the control input, a first stage cost which is associated with a first probability potential field representing a probability that the real obstacle may be present based on the position of the real obstacle, and a second stage cost which is associated with a second probability potential field representing a probability that the virtual obstacle may be present based on the position of the virtual obstacle and having a probability value equal to or greater than that of the first probability potential field. Furthermore, the state variable associated with the control target includes a prescribed integration term represented by a product of the deviation and the prescribed integration gain, and the prescribed integration gain becomes smaller as a distance between the control target and the real obstacle is reduced.

The control device according to the second aspect is different from the control device according to the first aspect in terms that the control device according to the second aspect further includes a servo integrator. By adopting this configuration, the model prediction control that is based on the deviation is performed. Thereby, a steady-state deviation can be effectively eliminated without unnecessarily deteriorating a following transient response to the prescribed target command. In addition, because the control device eliminates the steady-state deviation by including the prescribed integration term in the prediction model, a load required for designing a control system can be greatly reduced, and the suitable following control of the control target is available. When an observer or the like which estimates a disturbance that causes the steady-state deviation is used as in the conventional technology, the parameter design of the observer is difficult, and the calculation load becomes relatively large, and thus the configuration of the present invention is also useful from this viewpoint.

However, by including the prescribed integration term in the state variable, even if the repulsive force formed by the first potential field of the real obstacle and the repulsive force formed by the second potential field of the virtual obstacle act on the control target in the model prediction control, an influence caused by the prescribed integration term becomes relatively strong when the time elapses or the deviation between the position of the control target and the target position widens due to a transition of the target command. Therefore, the effect of the repulsive force formed by the second potential field of the virtual obstacle is relatively weakened, and as a result, it becomes difficult to control the control target so as to avoid the rear of the real obstacle. Therefore, in the control device according to the second aspect, the prescribed integration gain included in the prescribed integration term is reduced as the distance between the control target and the real obstacle becomes shorter. Thereby, when the control target is close to the real obstacle and the possibility of the collision is increased, the effect of the repulsive force formed by each respective potential field of the real obstacle and the virtual obstacle can be relatively increased, and thereby the following to the target command can be realized and the collision with the real obstacle can be suitably avoided.

Here, in the control device described above, as an approach angle of the real obstacle is close to 90 degrees with respect to the following target trajectory, the action of the repulsive force formed by the first potential field of the real obstacle and the repulsive force formed by the second potential field of the virtual obstacle on the control target in the model prediction control tends to be weakened. As a result, even when the control target is relatively close to the real obstacle, the following speed cannot be suitably reduced, and it becomes difficult to avoid the collision between the control target and the real obstacle. Therefore, a second acquisition part may be further included, which acquires an approach angle of the real obstacle with respect to the following target trajectory, the approach angle being defined as an angle between a moving direction of the control target and a moving direction of the real obstacle. In this case, in the stage costs calculated by the prescribed evaluation function, the second stage cost may be calculated to become larger as the approach angle is close to 90 degrees. By calculating the second stage cost depending on the approach angle in this way, the collision between the real obstacle and the control target can be avoided without being influenced by the approach angle of the real obstacle.

Moreover, in the control device described above, the approach angle may be calculated based on a past position of the real obstacle acquired by the first acquisition part. Thereby, in terms of the real obstacle whose course cannot be known in advance originally, the approach angle to the following target trajectory can be predicted. Moreover, as an example, the approach angle to the following target trajectory can be calculated by linear approximation of the movement from last two positions of the real obstacle, or polynomial approximation of the movement from last multiple positions of the real obstacle.

Here, in the control device described above, after the position of the control target has passed a position of an intersection where the following target trajectory and the obstacle trajectory traced by the real obstacle intersect, in the stage costs calculated by the prescribed evaluation function, the second stage cost may be calculated to become smaller as the position of the control target is far from the position of the intersection. When the position of the control target has passed the position of the intersection in the process in which the control target advances on the following target trajectory, the collision between the control target and the real obstacle is basically avoided. Therefore, as described above, the second stage cost is calculated to become smaller as the control target is far from the intersection after the position of the control target has passed the position of the intersection, and thereby the repulsive force formed by the second potential field of the virtual obstacle can be avoided from inadvertently acting on the control target, and the suitable following control of the control target can be realized. In addition, as another method, in the control device described above, after the position of the control target has passed the position of the intersection where the following target trajectory and the obstacle trajectory traced by the real obstacle intersect, the second stage cost may be set to zero in the stage costs calculated by the prescribed evaluation function.

Here, in the control device described above, when a plurality of real obstacles are present regarding the control target following the target command, the position of the virtual obstacle corresponding to each real obstacle is set by the set part, and each real obstacle and each virtual obstacle are reflected in the calculation of the stage costs of the model prediction control, and thereby even if a plurality of real obstacles are present, the plurality of real obstacles can be suitably avoided, and the following of the control target to the target command can be realized. However, if the model prediction control is to be performed corresponding to many real obstacles, the processing load of the control device which is required for the model prediction control is increased, and thus it is preferable to limit the number of the real obstacles that can be handled in the control device to a prescribed number.

Besides, based on the condition that the number of the real obstacles that can be handled in the model prediction control by the control device is limited to the prescribed number, the prescribed evaluation function may be formed in a manner that the first stage cost and the second stage cost corresponding to each of the real obstacles having a prescribed number of two or more are calculated. Besides, when positions of the real obstacles having a prescribed excess number exceeding the prescribed number are acquired by the first acquisition part, the prescribed number of real obstacles may be extracted from the prescribed excess number of real obstacles based on a separation distance between the control target and each of the prescribed excess number of real obstacles; furthermore, in the stage costs calculated by the prescribed evaluation function, the first stage cost may be calculated based on the positions of the prescribed number of real obstacles which are extracted, and the second stage cost may be calculated based on the positions of the prescribed number of virtual obstacles corresponding to the prescribed number of real obstacles which are extracted. That is, when the real obstacles exceeding the prescribed number are present, the real obstacles which are preferentially reflected in the model prediction control are extracted based on a separation distance from the control target. This is because the separation distance between the control target and the real obstacle is an important factor for the collision avoidance. By adopting this configuration, while the processing load of the control device is suppressed as much as possible, the collision between the control target and the real obstacle can be avoided and the following control to the target command can be realized.

Effect

When output of a control target is made to follow a target command by model prediction control, a collision with a moving obstacle can be suitably avoided.

DESCRIPTION OF THE EMBODIMENTS

Application Example

Figure 1:
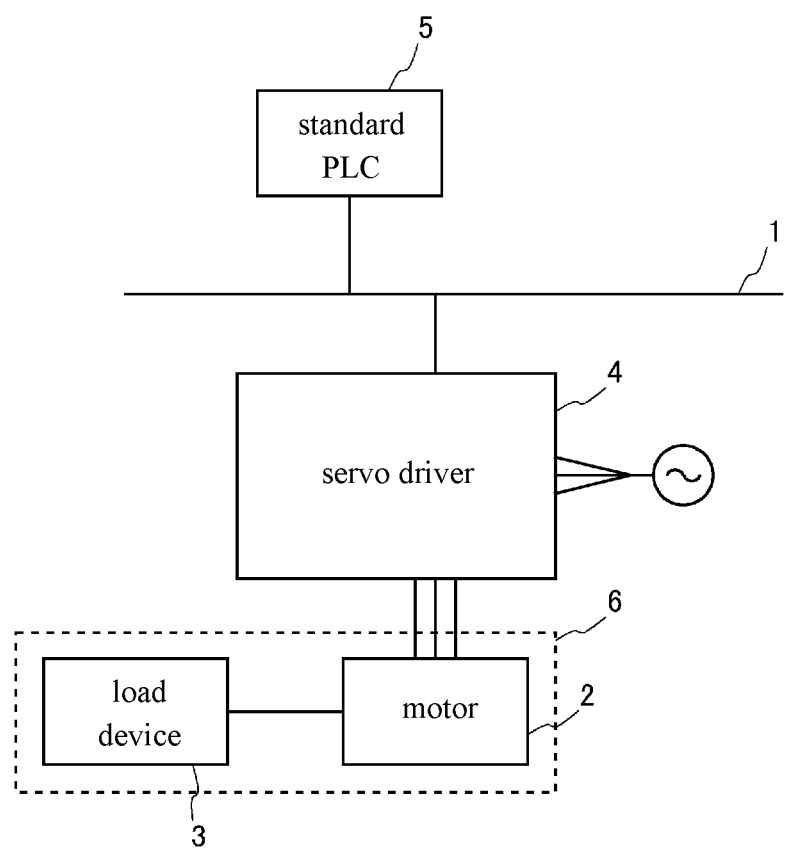
FIG. 1 is a first diagram showing a schematic configuration of a control system including a servo driver which is a control device.
Figure 2:
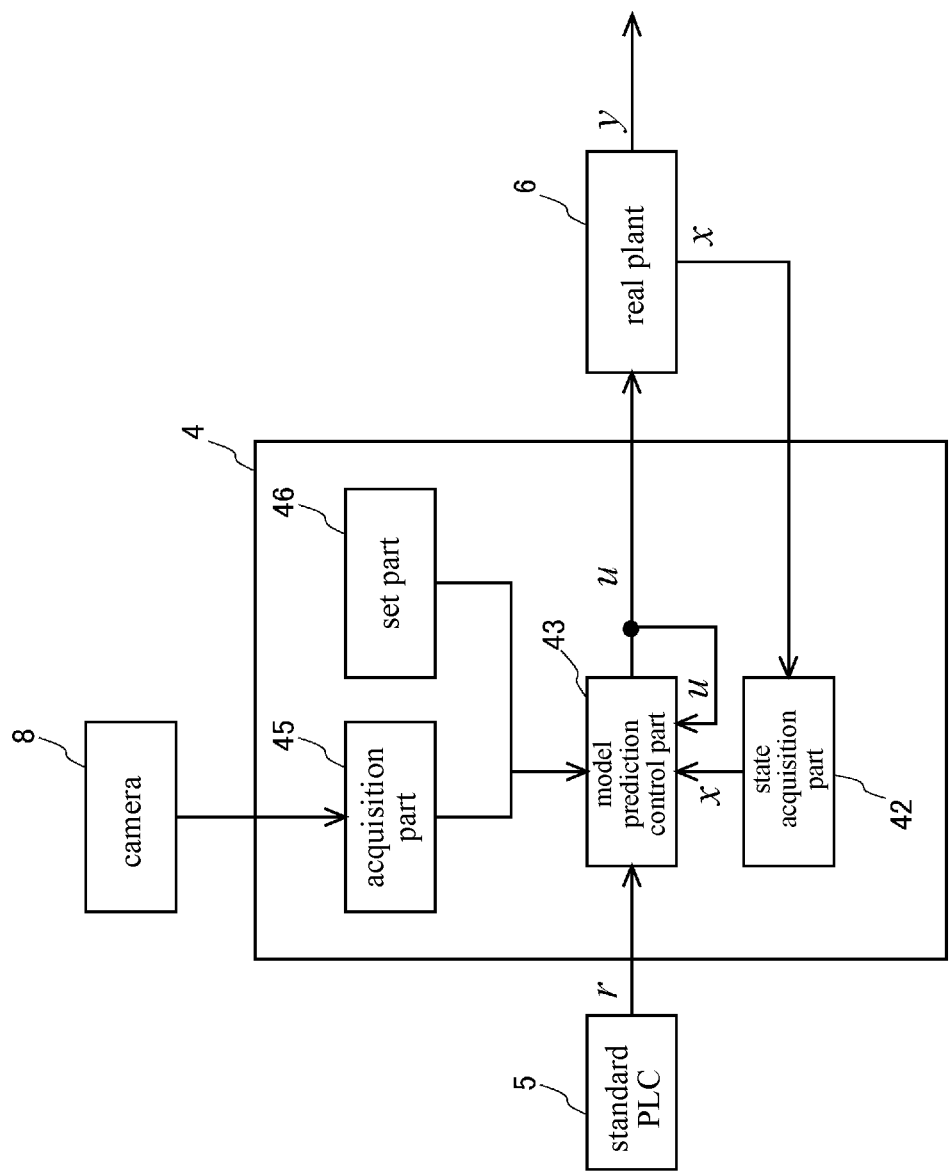
FIG. 2 is a first diagram showing a control structure of a servo driver of an embodiment.
Figure 3:
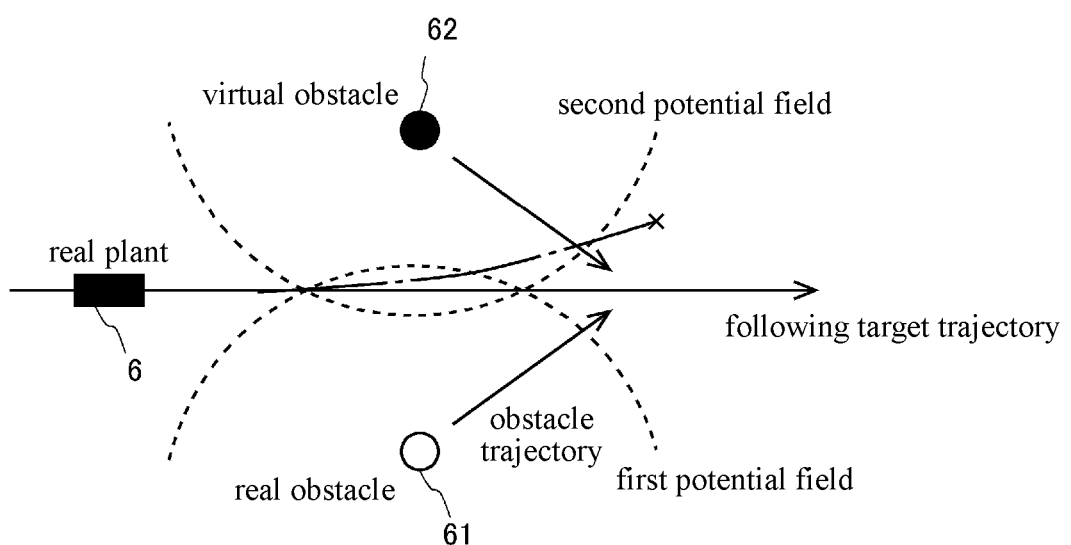
FIG. 3 is a diagram illustrating an outline for avoiding a collision with a real obstacle in model prediction control executed by the servo driver of the embodiment.

An application example of a control device according to an embodiment is described with reference to FIGS. 1 to 3. FIG. 1 is a schematic configuration diagram of a control system. The control system includes a network 1, a servo driver 4, and a standard programmable logic controller (PLC) 5. The servo driver 4 is a control device which includes a motor 2 and a load device 3 and is used for servo-controlling an actual plant (hereinafter, simply referred to as "real plant") 6. The real plant 6 is a control target. In the control system, the servo driver 4 performs feedback control on the real plant 6 so as to make output of the real plant 6 follow a target command sent from the standard PLC 5. The servo driver 4 generates control input for performing the following control of the real plant 6 based on the target command received from the standard PLC 5. The generation of the control input by the servo driver 4 is described later. Here, as the load device 3 constituting the real plant 6, various mechanical devices (for example, an arm of an industrial robot and a transfer device) can be exemplified, and the motor 2 is incorporated in the load device 3 as an actuator for driving the load device 3. For example, the motor 2 is an AC servomotor. Moreover, an encoder (not shown) is attached to the motor 2, and parameter signals (such as a position signal, a speed signal, and the like) related to an operation of the motor 2 are fed back and transmitted to the servo driver 4 by the encoder.

The standard PLC 5 generates a target command related to an operation (a motion) of the real plant 6, and transmits the target command to the servo driver 4. The servo driver 4 receives the servo command from the standard PLC 5 via the network 1, and receives the feedback signal output from the encoder connected to the motor 2. Then, the servo driver 4 supplies a drive current to the motor 2 based on the servo command and the feedback signal from the encoder in a manner that the output of the real plant 6 follows the prescribed command. As the supply current, alternating-current electric power sent from an alternating-current power supply to the servo driver 4 is used. In the example, the servo driver 4 is in a type that receives a three-phase alternating current, but may also be in a type that receives a single-phase alternating current. Moreover, as shown in FIG. 2, the model prediction control by a model prediction control part 43 is executed in the servo driver 4 so as to servo-control the real plant 6.

Here, a control structure of the servo driver 4 is described with reference to FIG. 2. Moreover, the target command supplied from the standard PLC 5 to the servo driver 4 is referred to by r, and the control input to the real plant 6 is referred to by u. The servo driver 4 has a state acquisition part 42, the model prediction control part 43, an acquisition part 45, and a set part 46. Besides, each processing by the state acquisition part 42, the model prediction control part 43, the acquisition part 45, and the set part 46 is subjected to arithmetic execution by an arithmetic processing device mounted on the servo driver 4.

Besides, in the example, the state acquisition part 42 and the model prediction control part 43 are formed. The state acquisition part 42 acquires a value of a state variable included in a state x which is related to the real plant 6 and is used for the model prediction control performed by the model prediction control part 43. Then, the model prediction control part 43 executes the model prediction control (Receding Horizon control) by using the state x which is related to the real plant 6 and acquired by the state acquisition part 42 and the control input u which is output to the real plant 6 by the model prediction control part 43 itself.

Specifically, the model prediction control part 43 has a prediction model in which a correlation between the state x related to the real plant 6 and the control input u to the real plant 6 is defined by the following state equation (Equation 1). Moreover, the following Equation 1 is a non-linear state equation. The prediction model may reflect, for example, a prescribed physical characteristic of the real plant 6.

[Equation 1]

$$\dot{x}(t) = P(x(t), u(t)) = \begin{bmatrix} \dot{x} \\ \ddot{x} \end{bmatrix} = \begin{bmatrix} \dot{x} \\ \dfrac{u}{M} \end{bmatrix} \quad \text{(Equation 1)}$$

Here, the model prediction control part 43 takes the state x related to the real plant 6 and the control input u to the real plant 6 as the input, and performs the model prediction control that is based on the prediction model represented by Equation 1 according to an evaluation function shown in the following Equation 2 in a prediction interval of a prescribed time width T.

[Equation 2]

$$J = \varphi(x(t+T)) + \int_t^{t+T} L(x(\tau), u(\tau)) d\tau \quad \text{(Equation 2)}$$

A first term on the right side of the above Equation 2 is a terminal cost, and a second term on the right side is a stage cost. Besides, the stage cost can be represented by the following Equation 3.

[Equation 3]

$$L = \tfrac{1}{2}((x\,\text{ref} - x)^T(k) Q (x\,\text{ref} - x)(k) + (u\,\text{ref} - u)^T(k) R (u\,\text{ref} - u)(k)) + (\text{firststage cost}) + (\text{second stage cost}) \quad \text{(Equation 3)}$$

Here, xref(k) represents a target state quantity at a time k, x(k) represents a computational state quantity at the time k, uref(k) represents target control input in a steady state at the time k, and u(k) represents computational control input at the time k. In addition, Q and R are coefficients (weight coefficients) respectively representing a weight of the state quantity in the stage cost and a weight of the control input in the stage cost. Therefore, a first term on the right side of Equation 3 means a stage cost related to the state quantity and is referred to as "state quantity cost", and a second term on the right side means a stage cost related to the control input and is called "control input cost". In addition, a first stage cost which is a third term on the right side and a second stage cost which is a fourth term are described later.

Furthermore, in the example, the acquisition part 45 and the set part 46 are formed. The acquisition part 45 acquires prescribed parameters related to the actual obstacle (the real obstacle) recognized via imaging of a camera 8. The prescribed parameters may be a position of the real obstacle, an approach angle θ of the real obstacle with respect to a following target trajectory (hereinafter, simply referred to as "approach angle") which is defined as an angle between a moving direction of the real obstacle when the real obstacle is moving and a moving direction of the control target during the following control, and the like.

For example, because a region imaged by the camera 8 is known, the acquisition part 45 can acquire the position of the real obstacle by a conventional technology such as image processing of the captured image or the like. In addition, the approach angle of the real obstacle can be acquired based on the past position of the real obstacle which has been acquired. As an example, linear approximation is made on the movement from last two positions OP1 and OP2 of the real obstacle acquired by the acquisition part 45, and furthermore, linear approximation is made on the movement from two positions TP1 and TP2 of the real plant 6 at the corresponding timing. Then, the approach angle θ can be calculated according to the cosine theorem. In addition, as another method, the approach angle θ to the following target trajectory can also be calculated by polynomial approximation of the movement from last multiple positions of the real obstacle.

In addition, the set part 46 sets a position of a virtual obstacle based on the position of the real obstacle. The virtual obstacle is an obstacle which is virtually set for avoiding the collision between the real plant 6 to be controlled and the real obstacle, and for calculating the stage costs according to Equation 3, especially for calculating the second stage cost. Therefore, different from the real plant 6 and the real obstacle, the virtual obstacle is not present actually. The set part 46 sets the virtual obstacle to be positioned substantially symmetrically to the real obstacle with reference to the following target trajectory of the real plant 6, and the details thereof are described later.

The value of the control input u at an initial time t of the prediction interval, which is calculated in the model prediction control based on the above, is output as the control input u to the real plant 6 corresponding to the target command r at the time t. Then, in the model prediction control, the prediction interval of the prescribed time width T is set each time at the control time, and the control input u to the real plant 6 at the control time is calculated according to the evaluation function in Equation 2, and is sent to the real plant 6. The problem of obtaining an operation amount with the best value of an evaluation function J in the form of Equation 2 is widely known as an optimal control problem, and an algorithm for calculating the numerical solution is disclosed as a known technology. A continuation method can be exemplified as the technology and the details are disclosed in, for example, "A continuation/GMRES method for fast computation of nonlinear receding horizon control" {T. Ohtsuka, Automatica, Vol. 40, p 563-574, 2004.} which is a known literature.

In the continuation method, input U(t) in the model prediction control is calculated by solving a simultaneous linear equation which is related to the input U(t) and is shown in the following Equation 4. Specifically, Equation 4 is solved, dU/dt is numerically integrated, and the input U(t) is updated. In this way, in the continuation, the calculation is not performed iteratively, and thus an arithmetic load for calculating the input U(t) at each time can be suppressed as much as possible.

[Equation 4]

$$\frac{\partial F}{\partial U} \dot{U} = -\zeta F - \frac{\partial F}{\partial x} \dot{x} - \frac{\partial F}{\partial t} \quad \text{(Equation 4)}$$

Here, F and U(t) are represented by the following Equation 5.

[Equation 5]

$$F(U(t), x(t), t) = \begin{bmatrix} \frac{\partial H}{\partial u}(x_0^*(t), u_0^*(t), \lambda_1^*(t), \mu_0^*(t)) \\ C(x_0^*(t), u_0^*(t)) \\ \cdots \\ \frac{\partial H}{\partial u}(x_{N\_1}^*(t), u_{N\_1}^*(t), \lambda_N^*(t), \mu_{N\_1}^*(t)) \\ C(x_{N\_1}^*(t), u_{N\_1}^*(t)) \end{bmatrix} \quad \text{(Equation 5)}$$

$$U(t) = \begin{bmatrix} u_0^{*T}(t), \mu_0^{*T}(t), \ldots u_{N\_1}^{*T}(t), \mu_{N\_1}^{*T}(t) \end{bmatrix}$$

Here, H is Hamiltonian, λ, is a costate, and μ is a Lagrange multiplier with a constraint condition C=0.

Here, the details of the calculation of the stage costs according to the above Equation 3 in the embodiment are described with reference to FIG. 3. FIG. 3 shows a state in which a real obstacle 61 that is moving is present around the real plant 6 controlled to follow the target command r. The existence of the real obstacle 61 is recognized by the imaging of the camera 8, and a position of the real obstacle 61 is acquired by the acquisition part 45. Moreover, an acquired position of the real obstacle 61 is referred to as "p61". Here, based on the relative movement of the real obstacle 61 with respect to the real plant 6, a probability potential field (a probability potential field caused by the real obstacle 61 is taken as a first potential field) can be calculated, which represents a probability that the real obstacle 61 may be present around the real plant 6. Because the calculation itself of the probability potential field is a known technology, the probability potential field can be calculated using, for example, a technology described in Japanese Patent Laid-Open No. 2003-241836.

Besides, in the embodiment, regardless of whether or not the first potential field of the real obstacle 61 is directly calculated, the first stage cost associated with the first potential field is included in the stage costs calculated in the model prediction control by the model prediction control part 43 (see the above Equation 3). Moreover, the first stage cost can be represented by the following Equation 6.

[Equation 6]

$$\text{first stage cost} = \frac{k}{\exp(n_{obs})} \quad \text{(Equation 6)}$$

$$n_{obs} = |pt - p61|$$

Here, pt is a position of the real plant 6, and k is a coefficient associated with the first potential field.

By generating the first stage cost in this way, the first stage cost is increased when the probability value of the first potential field becomes higher, and the control input u is calculated by the model prediction control part 43 in a manner that the following control to the target command r is performed, and as a result, a "repulsive force" formed by the first potential field of the real obstacle 61 keeps the real plant 6 controlled to follow the target command r away from the real obstacle 61. For example, the real plant 6 traces an avoidance trajectory shown by a dash-dot-dash line in FIG. 3 by the control input u. However, in the avoidance trajectory, the real plant 6 avoids in front of the moving real obstacle 61, and thus a time when the real plant 6 is influenced by the first potential field of the real obstacle 61 becomes longer, and in some cases, it may become difficult for the real plant 6 to avoid the real obstacle 61 (FIG. 3 shows a state in which the real plant 6 tracing the avoidance trajectory collides with the real obstacle 61 at a position indicated by "x").

Therefore, in the embodiment, in order to suitably avoid the collision between the moving real obstacle 61 and the real plant 6, the position of the virtual obstacle 62 is set by the set part 46. Specifically, the virtual obstacle 62 is set so as to be positioned substantially symmetrically to the real obstacle 61 with reference to the following target trajectory of the real plant 6. Moreover, the position of the virtual obstacle 62 is referred to as "p62". In addition, similar to the case of the real obstacle 61, a probability potential field (a probability potential field caused by the virtual obstacle 62 is taken as a second potential field) can be calculated, which represents a probability that the virtual obstacle 62 may be present around the real plant 6. Further, similar to the real obstacle 61, regardless of whether or not the second potential field of the virtual obstacle 62 is directly calculated, the second stage cost associated with the second potential field is included in the stage costs calculated in the model prediction control by the model prediction control part 43 (see the above Equation 3). Moreover, the second stage cost can be represented by the following Equation 7.

[Equation 7]

$$\text{second stage cost} = \frac{k}{\exp(n_{pobs})} \quad \text{(Equation 7)}$$

$$n_{pobs} = |pt - p62|$$

Here, pt is a position of the real plant 6, and k is a coefficient associated with the second potential field, which is the same as k shown in Equation 6 in the embodiment.

Figure 4:
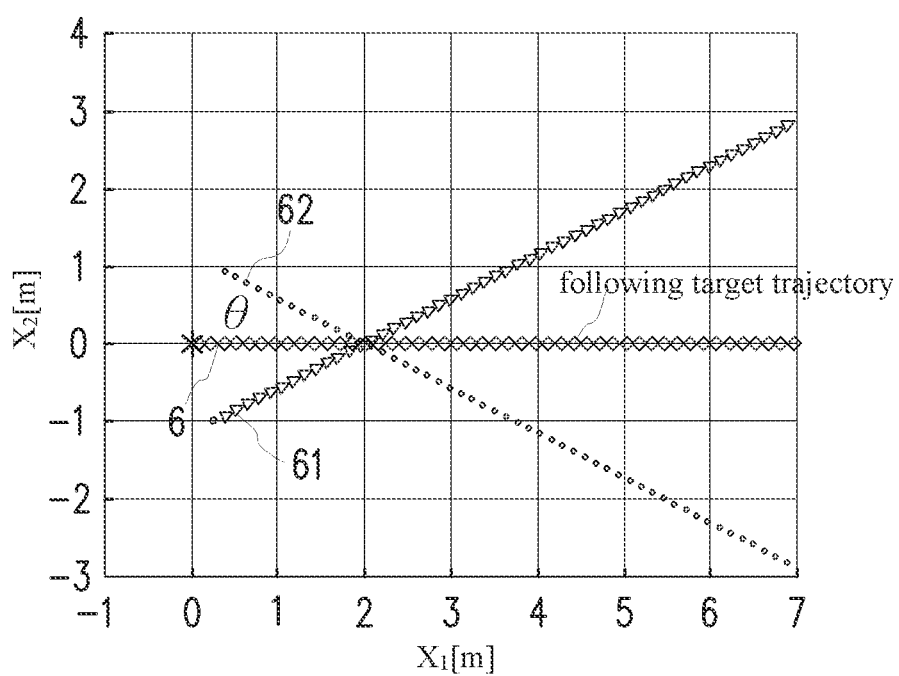
FIG. 4 is a first diagram showing a result of following control of a real plant by the servo driver of the embodiment.

By including the first stage cost and the second stage cost in the stage costs calculated in the model prediction control by the model prediction control part 43 in this way, the repulsive force of the first potential field of the real obstacle 61 can be applied to the real plant 6 from one side of the following target trajectory, and the repulsive force of the second potential field of the virtual obstacle 62 can be applied to the real plant 6 from the other side of the following target trajectory. FIG. 4 plots tracks of the real plant 6, the real obstacle 61, and the virtual obstacle 62 when the model prediction control of the embodiment is performed in the case where the real obstacle 61 advances at an approach angle θ of 30 degrees with respect to the following target trajectory to be followed by the real plant 6. Moreover, it should be noted in FIG. 4 that control axes used for the model prediction control include a horizontal axis and a vertical axis. As can be understood from the diagram, by the control input u calculated by the model prediction control of the embodiment, the following control of the real plant 6 on the following target trajectory is suitably maintained in a form that the real plant 6 suitably decelerates when approaching the real obstacle 61 and avoids the rear of the real obstacle 61.

First Configuration Example

Figure 5:
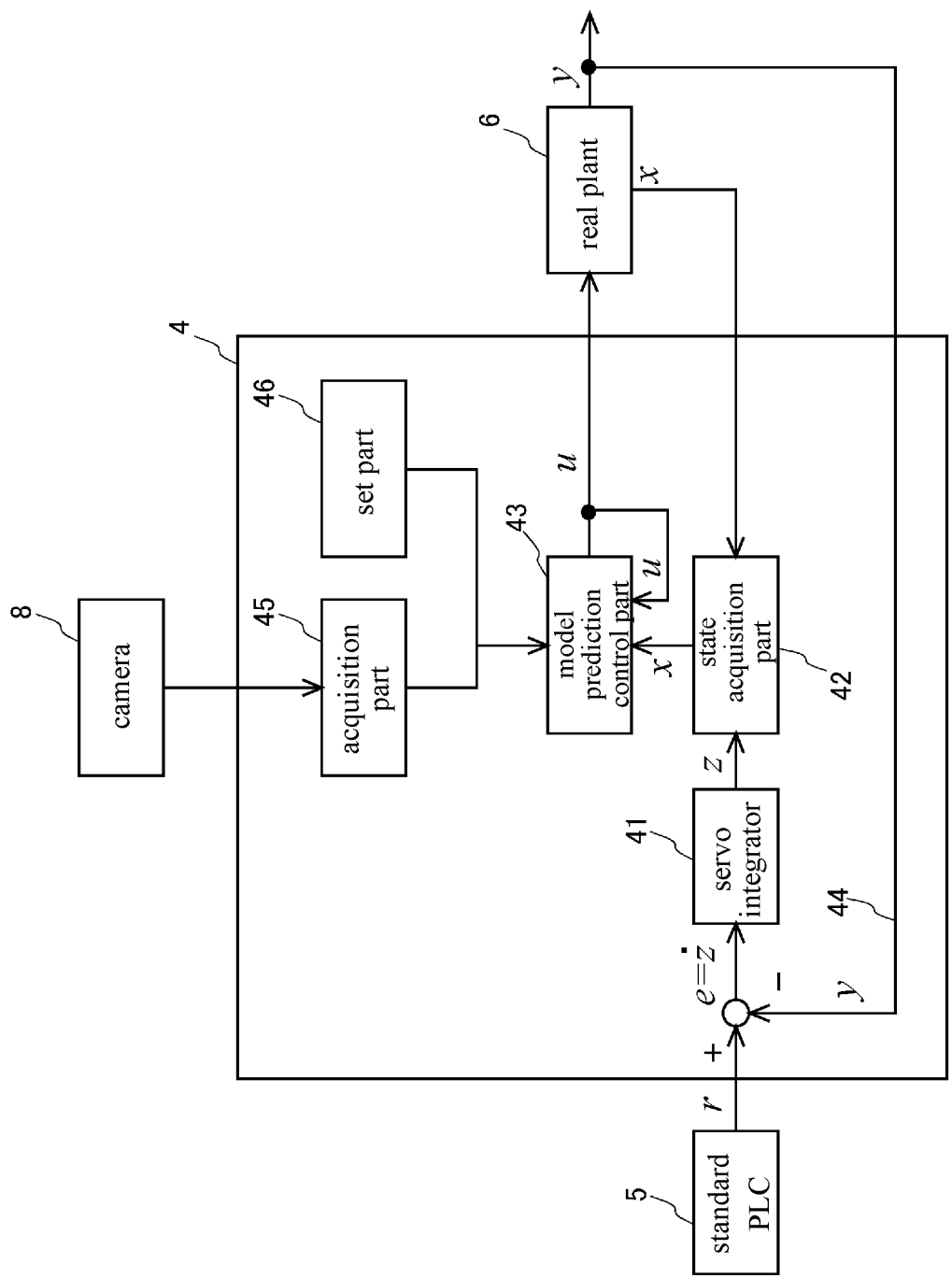
FIG. 5 is a second diagram showing the control structure of the servo driver of the embodiment.

The servo control by the servo driver 4 according to the configuration example is described with reference to FIG. 5. In the servo driver 4 of the configuration example, the model prediction control is performed by the model prediction control part 43 as in the application example described above, and at that time, output z of a servo integrator 41 is acquired by the state acquisition part 42 and is used for the model prediction control. Specifically, a deviation e (e=r−y) between the target command r transmitted from the standard PLC 5 and output y of the real plant 6 fed back by a feedback system 44 is input to the servo integrator 41. Then, the output z of the servo integrator 41 is input to the model prediction control part 43 via the state acquisition part 42. Therefore, the output z is added to the state variable related to the real plant 6 by the state acquisition part 42, and is used for the model prediction control performed by the model prediction control part 43.

Based on the control structure including the servo integrator 41 in this way, the prediction model possessed by the model prediction control part 43 in the configuration can be represented by, for example, the following Equation 8.

[Equation 8]

$$\dot{x}(t) = P(x(t), u(t)) = \begin{bmatrix} \dot{x} \\ \ddot{x} \\ \dot{z} \end{bmatrix} = \begin{bmatrix} \dot{x} \\ \dfrac{u}{M} \\ (r-y)K_i\zeta \end{bmatrix} \quad \text{(Equation 8)}$$

(r–y) in Equation 8 represents the deviation e. Besides, it can be understood that the prediction model includes an integration term represented by a product of the deviation e (r–y), and a first integration gain $K_i$ and a second integration gain $\zeta$. A product of the first integration gain $K_i$ and the second integration gain $\zeta$ corresponds to a prescribed integration gain. Accordingly, in addition to the effects of the collision avoidance with the real obstacle and the suitable followability to the target command which are shown in the application example in the servo control performed by the servo driver 4 using the model prediction control, the integration amount which is a drive source of the servo control becomes easier to be adjusted, and the servo control in which overshoot is suppressed becomes easy to realize without using a disturbance observer which requires difficult adjustments such as an expansion of a disturbance model, a design of an observer gain and the like as in a conventional manner.

Figure 6:
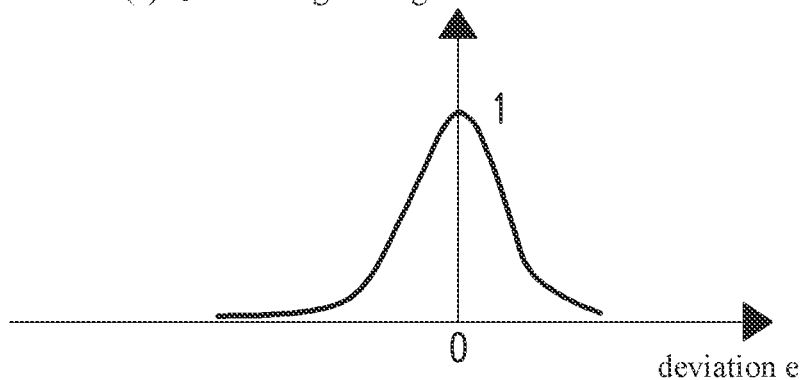
FIG. 6 is a diagram showing transitions of first and second integration gains set by the model prediction control performed by the servo driver shown in FIG. 5.
Figure 6:
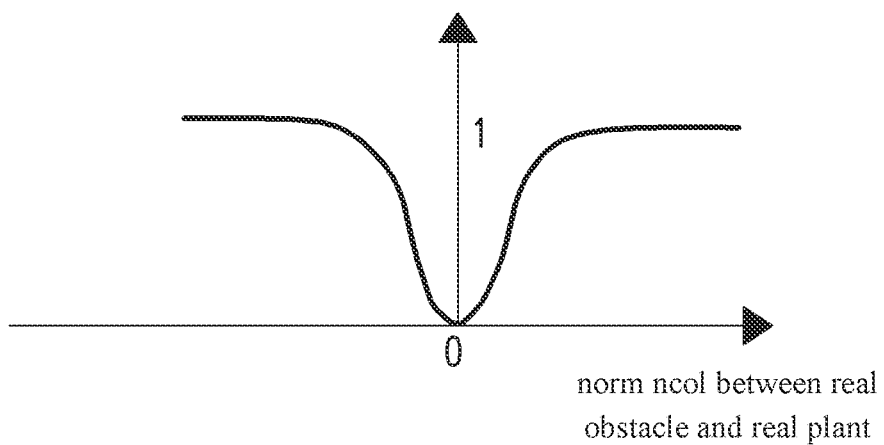

Here, the first integration gain $K_i$ constituting the prescribed integration gain of the integration term included in the prediction model shown in Equation 8 can be adjusted based on the deviation e as shown in an upper part (a) of FIG. 6. Specifically, the first integration gain $K_i$ is adjusted in a manner that the value of the first integration gain $K_i$ is increased as the magnitude of the deviation e is reduced. For example, the first integration gain $K_i$ is 0 when the magnitude of the deviation e is equal to or greater than a prescribed e0, and the first integration gain $K_i$ is set to a value of 0 or more and 1 or less in the range where the magnitude of the deviation e is less than e0. In addition, the transition of the first integration gain $K_i$ is set in a manner that the value of the first integration gain $K_i$ sharply approaches 1 as the magnitude of the deviation e is close to 0, and the first integration gain $K_i$ becomes 1 when the magnitude of the deviation e is 0. In this way, the first integration gain $K_i$ can be adjusted based on the magnitude of the deviation e, and thereby when the output y of the real plant 6 relatively deviates from the target command r, the value of the first integration gain $K_i$ is adjusted to be small, and is adjusted so that the integration amount for the servo control is not unnecessarily accumulated. In addition, when the deviation amount between the output y of the real plant 6 and the target command r becomes smaller, that is, when the magnitude of the deviation e becomes smaller, the value of the first integration gain $K_1$ is adjusted to be large, and thus the followability in the servo control can be effectively improved. By changing the value of the first integration gain $K_i$ in this way, both the vibration suppression and the overshoot suppression can be achieved, and the suitable followability of the servo control can be obtained.

On the other hand, considering the relationship between the real plant 6 and the real obstacle 61, when a distance (norm) between the real plant 6 and the real obstacle 61 becomes smaller, it basically turns into a situation in which the collision avoidance should be prioritized over the followability to the target command. In this situation, as described above, when the influence of the prescribed integration term of the prediction model due to the action of the first integration gain $K_i$ is relatively larger than the influence of the first stage cost and the second stage cost associated with the real obstacle 61 and the virtual obstacle 62, it may become difficult to avoid the collision with the real obstacle 61. Therefore, the second integration gain $\zeta$ is included in the prescribed integration gain. As shown in a lower part (b) of FIG. 6, the second integration gain $\zeta$ can be adjusted based on a parameter associated with a possibility that the real plant 6 collides with the real obstacle 61, for example, a separation distance (norm) ncol between the real plant 6 and the real obstacle 61. Specifically, the second integration gain $\zeta$ is 1 when the magnitude of the norm ncol is equal to or greater than a prescribed ncol0, and the second integration gain $\zeta$ is set to a value of 0 or more and 1 or less in the range where the magnitude of the norm ncol is less than ncol0. In addition, the transition of the second integration gain is set in a manner that the value of the second integration gain sharply approaches 0 as the magnitude of the norm ncol is close to 0.

Figure 7:
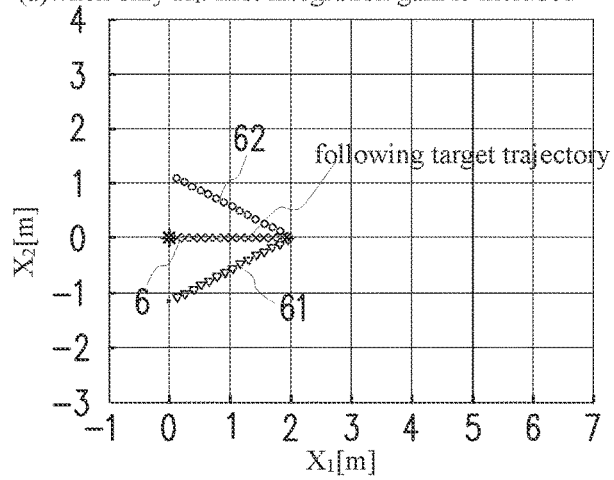
FIG. 7 is a second diagram showing the result of the following control of the real plant by the servo driver of the embodiment.
Figure 7:
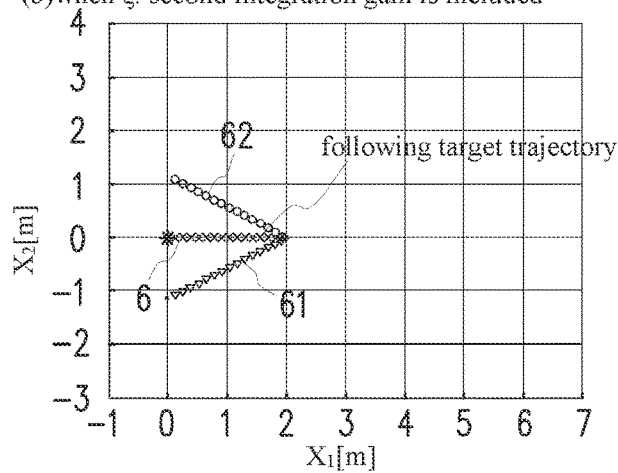

In this way, in the prescribed integration term of the prediction model shown in Equation 8, the prescribed integration gain is constituted by the product of the first integration gain $K_i$ and the second integration gain Therefore, basically, the followability to the target command r can be improved by an integration effect of the first integration gain $K_i$ according to the deviation e, but when the norm between the real plant 6 and the real obstacle 61 becomes smaller and the possibility of the collision is increased, the integration effect can be alleviated by an effect of the second integration gain $\zeta$ FIG. 7 plots the tracks of the real plant 6, the real obstacle 61, and the virtual obstacle 62 when the model prediction control of the embodiment is performed in the case in which the real obstacle 61 advances at the approach angle θ of 30 degrees with respect to the following target trajectory to be followed by the real plant 6. Moreover, it should be noted in FIG. 7 that control axes used for the model prediction control include a horizontal axis and a vertical axis. In addition, an upper part (a) of FIG. 7 plots the tracks when only the first integration gain $K_i$ is included in the prescribed integration term of the prediction model shown in Equation 8, and a lower part (b) of FIG. 7 plots the tracks when the first integration gain $K_i$ and the second integration gain $\zeta$ are included in the prescribed integration term as shown in Equation 8. As can be understood from the diagrams, in the upper part (a), the followability to the target command is good due to the integration effect, but the collision avoidance between the real plant 6 and the real obstacle 61 is not sufficient. On the other hand, in the lower part (b), as a result of alleviating the above integration effect, the deceleration of the real plant 6 works effectively, and the real plant 6 can avoid the rear of the real obstacle 61.

Moreover, in terms of the adjustment of the first integration gain $K_i$ and the second integration gain $\zeta$ data related to the correlation between the deviation e or the norm ncol and each integration gain shown in FIG. 6 may be stored in a memory of the servo driver 4, and in this case, the model prediction control part 43 performs the adjustment of each integration gain described above by accessing the data.

Second Configuration Example

The servo control by the servo driver 4 according to the configuration example is described. If the model prediction control considering the virtual obstacle 62 is continued after the collision between the real plant 6 and the real obstacle 61 is avoided, the repulsive force formed by the second potential field of the virtual obstacle 62 may adversely influence the followability of the real plant 6 to the target command r.

Therefore, in the model prediction control possessed by the model prediction control part 43 in the servo driver 4 of the configuration example, the second stage cost is calculated according to, for example, the following Equation 9. Moreover, the control structure to which the configuration example can be applied may be either FIG. 2 or FIG. 5.

[Equation 9]

$$\text{second stage cost} = \frac{k \times pseudoPot}{\exp(n_{pobs})} \quad \text{(Equation 9)}$$

$$n_{pobs} = |pt - p62|$$

$$pseudoPot = (\tanh((Pcross - pt) \times kz) + 1)/2$$

Here, Pcross described above is a position where the real plant 6 may collide with the real obstacle 61, for example, a position of an intersection where the following target trajectory by the real plant 6 is intersected with the obstacle trajectory where the real obstacle 61 is assumed to advance. It should be noted that Pcross is not the position where the real plant 6 actually collides with the real obstacle 61, but the position where it is assumed that the collision may occur although the collision is avoided by the embodiment. Therefore, after the real plant 6 has passed the position represented by Pcross, it basically means that the possibility of the collision between the real plant 6 and the real obstacle 61 is reduced.

In addition, the intersection position Pcross described above can be acquired based on the acquired past position of the real obstacle. As an example, linear approximation is made on the movement from the last two positions OP1 and OP2 of the real obstacle acquired by the acquisition part, and furthermore, linear approximation is made on the movement from the two positions TP1 and TP2 of the real plant 6 at the corresponding timing. Then, the position of an intersection of the two straight lines is defined as the intersection position Pcross.

According to the above Equation 9, the second stage cost is calculated in a manner that the second stage cost becomes smaller as the position of the real plant 6 is far from the intersection position Pcross in the calculation of the stage costs performed by the model prediction control, at least after the real plant 6 has passed the intersection position Pcross. As a result, after the real plant 6 has passed the intersection position Pcross, an inadvertent action on the real plant 6 caused by the second potential field of the virtual obstacle 62 can be reduced, and thereby the reduction of the followability can be avoided.

Figure 8:
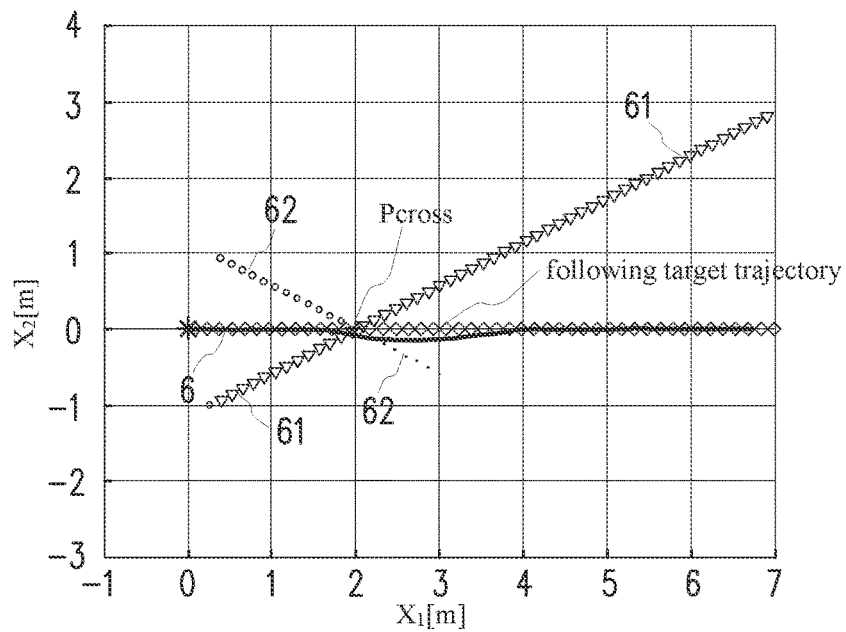
FIG. 8 is a third diagram showing the result of the following control of the real plant by the servo driver of the embodiment.

FIG. 8 plots the tracks of the real plant 6, the real obstacle 61, and the virtual obstacle 62 when the model prediction control of the embodiment is performed in the case where the real obstacle 61 advances at the approach angle θ of 30 degrees with respect to the following target trajectory to be followed by the real plant 6. Moreover, it should be noted in FIG. 8 that control axes used for the model prediction control include a horizontal axis and a vertical axis. As can be understood from FIG. 8, the size of the plot representing the virtual obstacle 62 is reduced after the real plant 6 has passed the intersection position Pcross. This means that the value of the second stage cost is calculated to be small by pseudoPot of the above Equation 9. As a result, after the real plant 6 has passed the intersection position Pcross, the influence of the virtual obstacle 62 can be alleviated, and the followability of the real plant 6 to the target command r can be avoided to be reduced.

Moreover, in the above Equation 9, the value of the second stage cost is calculated to be smaller as the real plant 6 is far from the intersection position Pcross after the real plant 6 has passed the intersection position Pcross, but the value of the second stage cost being calculated to be smaller in this way can be started before the real plant 6 approaches the intersection position Pcross. Furthermore, as another method, the value of the second stage cost may be set to zero after the real plant 6 has passed the intersection position Pcross.

Third Configuration Example

The servo control by the servo driver 4 according to the configuration example is described. As the approach angle of the real obstacle 61 is close to 90 degrees, the repulsive force formed by the first potential field of the real obstacle 61 and the repulsive force formed by the second potential field of the virtual obstacle corresponding to the real obstacle 61 become difficult to act on the real plant 6, and it is difficult to suitably avoid the collision with the real obstacle 61. Therefore, in the model prediction control possessed by the model prediction control part 43 in the servo driver 4 of the configuration example, the second stage cost is calculated according to, for example, the following Equation 10. Moreover, the control structure to which the configuration example can be applied may be either FIG. 2 or FIG. 5.

[Equation 10]

$$\text{second stage cost} = \frac{k \times pseudoPot}{\exp(n_{pobs})} \quad \text{(Equation 10)}$$

$$n_{pobs} = |pt - p62|$$

$$pseudoPot = 1 + \sin\theta$$

According to the above Equation 10, the second stage cost is calculated in a manner that the second stage cost becomes larger as the approach angle of the real obstacle 61 is close to 90 degrees. As a result, even if the approach angle of the real obstacle 61 is close to 90 degrees, the real plant 6 can suitably avoid the collision with the real obstacle 61 while maintaining the followability to the target command r.

Figure 9:
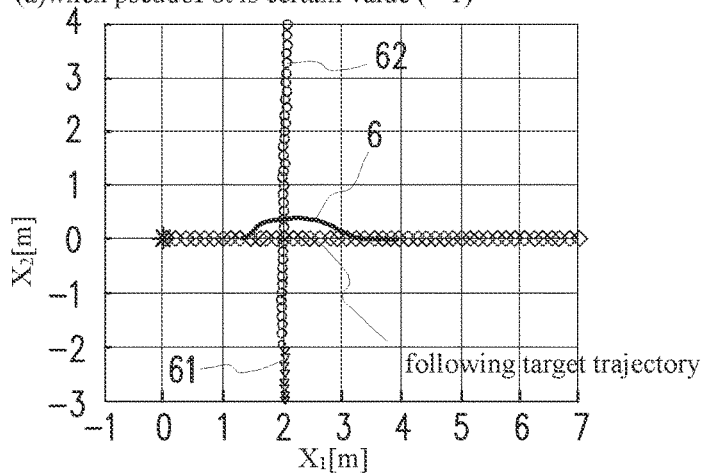
FIG. 9 is a fourth diagram showing the result of the following control of the real plant by the servo driver of the embodiment.
Figure 9:
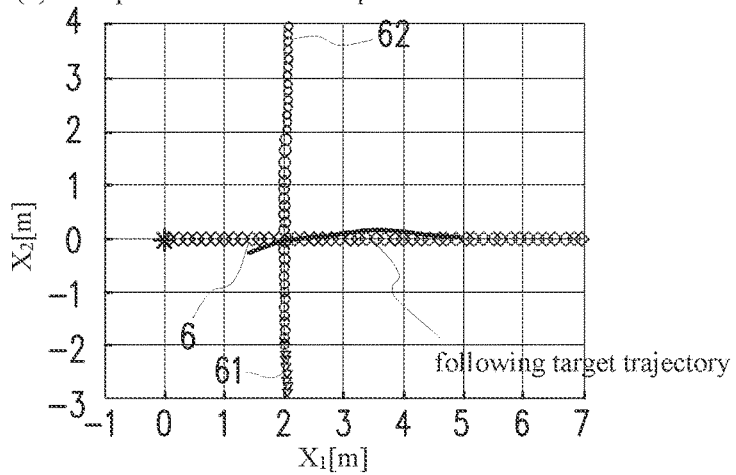

FIG. 9 plots the tracks of the real plant 6, the real obstacle 61, and the virtual obstacle 62 when the model prediction control of the embodiment is performed in the case where the real obstacle 61 advances at the approach angle θ of 90 degrees with respect to the following target trajectory to be followed by the real plant 6. Moreover, it should be noted in FIG. 9 that control axes used for the model prediction control include a horizontal axis and a vertical axis. In addition, an upper part (a) of FIG. 9 plots the tracks when pseudoPot of the prediction model shown in Equation 10 is fixed at a certain value (=1), and a lower part (b) of FIG. 9 plots the tracks when pseudoPot is adjusted corresponding to the approach angle of 90 degrees according to Equation 10. As can be understood from the diagrams, in the upper part (a), because the approach angle is 90 degrees, the repulsive force generated by each potential field is difficult to act on the real plant 6 as described above, and as a result, the real plant 6 avoids in front of the moving real obstacle 61 and the avoidance amount is also relatively large. On the other hand, in the lower part (b), the second stage cost is calculated in consideration of the approach angle θ. That is, when the approach angle is 90 degrees, the value of pseudoPot is 2, and the value of pseudoPot is doubled compared with the case of the upper part (a). As a result, the influence of the repulsive force generated by the second potential field of the virtual obstacle 62 can be exerted relatively large, and as shown in the lower part (b), the real plant 6 can avoid behind the moving real obstacle 61 and the avoidance amount is also relatively small.

Moreover, in the above-described example, the approach angle θ is reflected in the calculation of the second stage cost. Furthermore, as shown in the following Equation 11, the approach angle θ may also be reflected in the calculation of the first stage cost.

[Equation 11]

$$\text{first stage cost} = \frac{k \times (1 - \sin\theta)}{\exp(n_{obs})} \quad \text{(Equation 11)}$$

$$n_{obs} = |pt - p61|$$

Furthermore, the technical idea disclosed in the second configuration example may also be adopted in combination, and the approach angle θ may be reflected in the calculation of the second stage cost as shown in the following Equation 12.

[Equation 12]

$$\text{second stage cost} = \frac{k \times pseudoPot}{\exp(n_{pobs})} \quad \text{(Equation 12)}$$

$$n_{pobs} = |pt - p62|$$

$$pseudoPot = (1 + \sin\theta) \times (\tanh((Pcross - pt) \times kz) + 1)/2$$

Fourth Configuration Example

The servo control by the servo driver 4 according to the configuration example is described. The configuration example mentions the model prediction control when the existence of the plurality of (for example, two) real obstacles 61a and 61b (see FIG. 10 described later) is recognized and each position is acquired by the acquisition part 45 while the real plant 6 is controlled to follow the target command r. In the model prediction control by the model prediction control part 43 of the configuration example, according to the following Equation 12, the first stage cost is calculated for each of the two recognized real obstacles 61a and 61b, and the second stage cost is calculated for each of virtual obstacles 62a and 62b which are set by the set part 46 corresponding to each of the real obstacles 61a and 61b.

[Equation 13]

$L = \frac{1}{2}((x\text{ ref}-x)^T(k)Q(x\text{ ref}-x)(k) + (uref-u)^T(k)R(uref-u)(k)) + (\text{first stage cost associated with each of real obstacles } 61a \text{ and } 61b) + (\text{second stage cost associated with each of virtual obstacles } 62a \text{ and } 62b)$ (Equation 13)

Moreover, the calculations of each first stage cost and each second stage cost are as shown in the application example and the configuration examples described above.

Figure 10:
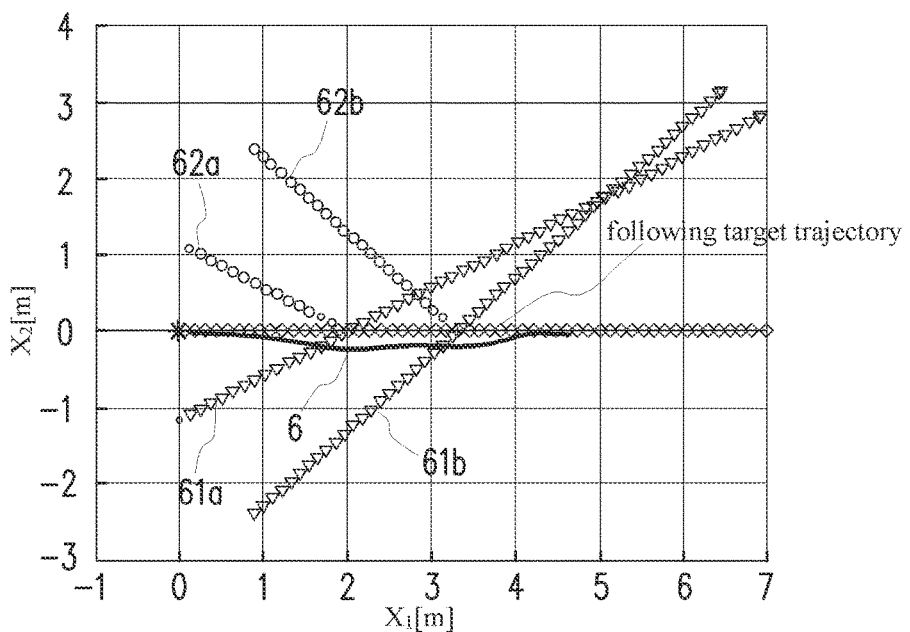
FIG. 10 is a fifth diagram showing the result of the following control of the real plant by the servo driver of the embodiment.

By calculating the stage costs in the model prediction control according to Equation 13 in this way, even when the plurality of real obstacles 61a and 61b are present, both the followability of the real plant 6 to the target command r and the collision avoidance with each real obstacle can be suitably achieved. FIG. 10 plots the tracks of the real plant 6, the real obstacles 61a and 61b, and the virtual obstacles 62a and 62b when the model prediction control of the embodiment is performed in the case where the two real obstacles 61a and 61b advance with respect to the following target trajectory to be followed by the real plant 6. Moreover, it should be noted in FIG. 10 that control axes used for the model prediction control include a horizontal axis and a vertical axis. The virtual obstacles 62a and 62b are respectively set by the set part 46 so as to correspond to the real obstacles 61a and 61b. In addition, in the form shown by FIG. 10, as shown in the configuration example 2, after the real plant 6 has passed the intersection position with each real obstacle, the value of the second stage cost associated with the virtual obstacle corresponding to the real obstacle is set to zero. As can be understood from FIG. 10, by performing the model prediction control of the embodiment according to Equation 13, the real plant 6 avoids behind each of the two real obstacles 61a and 61b, and suitably maintains the followability to the target command r.

In addition, even when the number of the real obstacles is 3 or more, the virtual obstacles according to the number are set by the set part 46, and the first stage costs associated with the real obstacles and the second stage costs associated with the virtual obstacles are calculated to perform the model prediction control, thereby avoiding the collision with each real obstacle and achieving the suitable following to the target command r.

However, if the number of the real obstacles considered in the model prediction control is increased, the processing load of the servo driver 4 is increased according to the number, which may hinder the following control of the real plant 6 in real time. Therefore, in consideration of the processing load of the servo driver 4, the number of the real obstacles considered in the model prediction control and the number of the virtual obstacles set corresponding to the real obstacles may be limited to a prescribed number (for example, two each). In this case, when the existence of the real obstacles having a prescribed excess number (for example, three) exceeding the prescribed number is recognized, and the positions of the prescribed excess number of real obstacles are acquired by the acquisition part 45, the maximum prescribed number of real obstacles that can be considerate in the model prediction control are extracted from the prescribed excess number of real obstacles according to a prescribed standard. As the prescribed standard, the separation distance between the real plant 6 and the real obstacle can be used in consideration of the possibility of the collision between the real plant 6 and the real obstacle. For example, the smaller the separation distance, the higher the possibility of the collision, which means that the collision should be preferentially avoided, and thus the prescribed number of real obstacles may be extracted in order from the one with the smallest separation distance. Moreover, in the model prediction control, the first stage cost associated with each real obstacle is calculated based on each position of the extracted real obstacles, and the second stage cost associated with each virtual obstacle is calculated based on each position of the prescribed number of virtual obstacles corresponding to the prescribed number of real obstacles which are extracted. By adopting this configuration, the processing load of the servo driver 4 is appropriately suppressed, and then the suitable following control of the real plant 6 in real time is realized.

APPENDIX 1

A control device,
which is a control device (4) that includes a model prediction control part (43) and makes output of a control target follow a prescribed target command, wherein the model prediction control part (43) has a prediction model in which a correlation between a prescribed state variable related to a control target (6) and control input to the control target (6) is defined in a form of a prescribed state equation, performs model prediction control that is based on the prediction model on a prescribed target command to be followed by the output of the control target (6) according to a prescribed evaluation function in a prediction interval of a prescribed time width, and outputs a value of the control input at least at an initial time of the prediction interval, the control device including:
a first acquisition part (45) which acquires a position of a real obstacle (61) that is an actual obstacle with respect to the control target (6), and
a set part (46) which sets a position of a virtual obstacle (62) associated with the real obstacle (61) based on the position of the real obstacle (61) acquired by the first acquisition part (45) in a manner that the virtual obstacle (62) is positioned substantially symmetrically to the real obstacle (61) with reference to a following target trajectory that is based on the prescribed target command and is to be followed by the control target (6),
wherein stage costs calculated by the prescribed evaluation function include: a state quantity cost which is a stage cost related to the prescribed state variable, a control input cost which is a stage cost associated with the control input, a first stage cost which is associated with a first probability potential field representing a probability that the real obstacle (61) may be present based on the position of the real obstacle (61), and a second stage cost which is associated with a second probability potential field representing a probability that the virtual obstacle (62) may be present based on the position of the virtual obstacle (62) and having a probability value equal to or greater than that of the first probability potential field.

APPENDIX 2

A control device,
which is a control device (4) that includes a model prediction control part (43) and makes output of a control target follow a prescribed target command, wherein the model prediction control part (43) has a prediction model in which a correlation between a prescribed state variable related to a control target (6) and control input to the control target (6) is defined in a form of a prescribed state equation, performs model prediction control that is based on the prediction model on a prescribed target command to be followed by the output of the control target (6) according to a prescribed evaluation function in a prediction interval of a prescribed time width, and outputs a value of the control input at least at an initial time of the prediction interval,
the control device including:
a servo integrator (41) to which a deviation between the prescribed target command and the output of the control target is input,
a first acquisition part (45) which acquires a position of a real obstacle (61) that is an actual obstacle with respect to the control target (6), and
a set part (46) which sets a position of a virtual obstacle (62) associated with the real obstacle (61) based on the position of the real obstacle (61) acquired by the first acquisition part (45) in a manner that the virtual obstacle (62) is positioned substantially symmetrically to the real obstacle (61) with reference to a following target trajectory that is based on the prescribed target command and is to be followed by the control target (6),
wherein stage costs calculated by the prescribed evaluation function include: a state quantity cost which is a stage cost related to the prescribed state variable, a control input cost which is a stage cost associated with the control input, a first stage cost which is associated with a first probability potential field representing a probability that the real obstacle (61) may be present based on the position of the real obstacle (61), and a second stage cost which is associated with a second probability potential field representing a probability that the virtual obstacle (62) may be present based on the position of the virtual obstacle (62) and having a probability value equal to or greater than that of the first probability potential field,
the state variable associated with the control target (6) includes a prescribed integration term represented by a product of the deviation and a prescribed integration gain, and the prescribed integration gain becomes smaller as a distance between the control target and the real obstacle is reduced.

What is claimed is:
1. A control device,
a processor, configured to makes output of a control target follow a prescribed target command and configured to perform
a model prediction control, wherein the model prediction control has a prediction model in which a correlation between a prescribed state variable related to the control target and a control input to the control target is defined in a form of a prescribed state equation, the model prediction control is performed based on the prediction model on the prescribed target command to be followed by the output of the control target according to a prescribed evaluation function in a prediction interval of a prescribed time width, and a value of the control input is output at least at an initial time of the prediction interval,
a first acquisition which acquires a position of a real obstacle that is an actual obstacle with respect to the control target, and
a set operation which sets a position of a virtual obstacle associated with the real obstacle based on the position of the real obstacle acquired by the first acquisition in a manner that the virtual obstacle is positioned substantially symmetrically to the real obstacle with reference to a following target trajectory of the control target that is based on the prescribed target command,
wherein stage costs calculated by the prescribed evaluation function comprise: a state quantity cost which is a stage cost related to the prescribed state variable, a control input cost which is a stage cost associated with the control input, a first stage cost which is associated with a first probability potential field representing a probability that the real obstacle is present based on the position of the real obstacle, and a second stage cost which is associated with a second probability potential field representing a probability that the virtual obstacle is present based on the position of the virtual obstacle and having a probability value equal to or greater than that of the first probability potential field.

2. A control device,
a processor, configured to makes output of a control target follow a prescribed target command and configured to perform
a model prediction control, wherein the model prediction control has a prediction model in which a correlation between a prescribed state variable related to the control target and a control input to the control target is defined in a form of a prescribed state equation, the model prediction control is performed based on the prediction model on the prescribed target command to be followed by the output of the control target according to a prescribed evaluation function in a prediction interval of a prescribed time width, and a value of the control input is output at least at an initial time of the prediction interval,
a first acquisition which acquires a position of a real obstacle that is an actual obstacle with respect to the control target, and
a set operation which sets a position of a virtual obstacle associated with the real obstacle based on the position of the real obstacle acquired by the first acquisition in a manner that the virtual obstacle is positioned substantially symmetrically to the real obstacle with reference to a following target trajectory of the control target that is based on the prescribed target command; and
a servo integrator to which a deviation between the prescribed target command and the output of the control target is input,
wherein stage costs calculated by the prescribed evaluation function comprise: a state quantity cost which is a stage cost related to the prescribed state variable, a control input cost which is a stage cost associated with the control input, a first stage cost which is associated with a first probability potential field representing a probability that the real obstacle is present based on the position of the real obstacle, and a second stage cost which is associated with a second probability potential field representing a probability that the virtual obstacle is present based on the position of the virtual obstacle and having a probability value equal to or greater than that of the first probability potential field,
the state variable associated with the control target comprises a prescribed integration term represented by a product of the deviation and a prescribed integration gain, and
the prescribed integration gain becomes smaller as a distance between the control target and the real obstacle is reduced.

3. The control device according to claim 1, wherein the processor is further configured to perform
a second acquisition which acquires an approach angle of the real obstacle with respect to the following target trajectory, wherein the approach angle is defined as an angle between a moving direction of the control target and a moving direction of the real obstacle, wherein
in the stage costs calculated by the prescribed evaluation function, the second stage cost is calculated to become larger as the approach angle is close to 90 degrees.

4. The control device according to claim 3, wherein
the approach angle is calculated based on a past position of the real obstacle acquired by the first acquisition.

5. The control device according to claim 1, wherein
after the position of the control target has passed a position of an intersection where the following target trajectory and an obstacle trajectory traced by the real obstacle intersect, in the stage costs calculated by the prescribed evaluation function, the second stage cost is calculated to become smaller as the position of the control target is far from the position of the intersection.

6. The control device according to claim 1, wherein
after the position of the control target has passed a position of an intersection where the following target trajectory and an obstacle trajectory traced by the real obstacle intersect, in the stage costs calculated by the prescribed evaluation function, the second stage cost is set to zero.

7. The control device according to claim 1, wherein
the prescribed evaluation function is formed in a manner that the first stage cost and the second stage cost corresponding to each of the real obstacles having a prescribed number of two or more are calculated, and
when positions of the real obstacles having a prescribed excess number exceeding the prescribed number are acquired by the first acquisition, the prescribed number of real obstacles are extracted from the prescribed excess number of real obstacles based on a separation distance between the control target and each of the prescribed excess number of real obstacles; furthermore, in the stage costs calculated by the prescribed evaluation function, the first stage cost is calculated based on the positions of the prescribed number of real obstacles which are extracted, and the second stage cost is calculated based on the positions of the prescribed number of virtual obstacles corresponding to the prescribed number of real obstacles which are extracted.

8. The control device according to claim 2, wherein the processor is further configured to perform
a second acquisition which acquires an approach angle of the real obstacle with respect to the following target trajectory, wherein the approach angle is defined as an angle between a moving direction of the control target and a moving direction of the real obstacle, wherein
in the stage costs calculated by the prescribed evaluation function, the second stage cost is calculated to become larger as the approach angle is close to 90 degrees.

9. The control device according to claim 8, wherein
the approach angle is calculated based on a past position of the real obstacle acquired by the first acquisition.

10. The control device according to claim 2, wherein
after the position of the control target has passed a position of an intersection where the following target trajectory and an obstacle trajectory traced by the real obstacle intersect, in the stage costs calculated by the prescribed evaluation function, the second stage cost is calculated to become smaller as the position of the control target is far from the position of the intersection.

11. The control device according to claim 3, wherein
after the position of the control target has passed a position of an intersection where the following target trajectory and an obstacle trajectory traced by the real obstacle intersect, in the stage costs calculated by the prescribed evaluation function, the second stage cost is calculated to become smaller as the position of the control target is far from the position of the intersection.

12. The control device according to claim 2, wherein
after the position of the control target has passed a position of an intersection where the following target trajectory and an obstacle trajectory traced by the real obstacle intersect, in the stage costs calculated by the prescribed evaluation function, the second stage cost is set to zero.

13. The control device according to claim 3, wherein
after the position of the control target has passed a position of an intersection where the following target trajectory and an obstacle trajectory traced by the real obstacle intersect, in the stage costs calculated by the prescribed evaluation function, the second stage cost is set to zero.

14. The control device according to claim 2, wherein
the prescribed evaluation function is formed in a manner that the first stage cost and the second stage cost corresponding to each of the real obstacles having a prescribed number of two or more are calculated, and
when positions of the real obstacles having a prescribed excess number exceeding the prescribed number are acquired by the first acquisition, the prescribed number of real obstacles are extracted from the prescribed excess number of real obstacles based on a separation distance between the control target and each of the prescribed excess number of real obstacles; furthermore, in the stage costs calculated by the prescribed evaluation function, the first stage cost is calculated based on the positions of the prescribed number of real obstacles which are extracted, and the second stage cost is calculated based on the positions of the prescribed number of virtual obstacles corresponding to the prescribed number of real obstacles which are extracted.

15. The control device according to claim 3, wherein
the prescribed evaluation function is formed in a manner that the first stage cost and the second stage cost corresponding to each of the real obstacles having a prescribed number of two or more are calculated, and
when positions of the real obstacles having a prescribed excess number exceeding the prescribed number are acquired by the first acquisition, the prescribed number of real obstacles are extracted from the prescribed excess number of real obstacles based on a separation distance between the control target and each of the prescribed excess number of real obstacles; furthermore, in the stage costs calculated by the prescribed evaluation function, the first stage cost is calculated based on the positions of the prescribed number of real obstacles which are extracted, and the second stage cost is calculated based on the positions of the prescribed number of virtual obstacles corresponding to the prescribed number of real obstacles which are extracted.

* * * * *